June 27, 1950 J. T. DVORAK 2,513,155
CORNSTALK CUTTER AND MACERATOR
Filed March 21, 1949 2 Sheets-Sheet 1

Joseph T. Dvorak, INVENTOR.

BY Bush & Bush
His Attorneys.

June 27, 1950 J. T. DVORAK 2,513,155
CORNSTALK CUTTER AND MACERATOR
Filed March 21, 1949 2 Sheets-Sheet 2

Joseph T. Dvorak, INVENTOR.
BY Bush & Bush
His Attorneys.

Patented June 27, 1950

2,513,155

UNITED STATES PATENT OFFICE 2,513,155

CORNSTALK CUTTER AND MACERATOR

Joseph T. Dvorak, Davenport, Iowa, assignor of one-half to Clifford H. Anderson, Davenport, Iowa Application March 21, 1949, Serial No. 82,663

18 Claims. (Cl. 56—18)

My invention relates to agricultural implements.

One of the greatest of the 350 insect pests which attack corn in modern times, is the so-called European corn borer which came to the United States about 1910 and in recent years has become widespread in the United States. The corn borer worms hatch out from eggs laid in or on the growing corn stalks by small moths, and after the eggs hatch, the worms coming from them crawl in the stalks, toward the ears and create great damage by cutting off the supply of sap to the ears causing them to wilt and hang down. These worms, or their pupae hibernate throughout the winter in the stalks and in the spring develop into moths which lay more eggs and so the cycle is repeated.

The objects of my invention are to provide mechanical means which can be drawn by a tractor or can be attached to tractor-drawn corn-pickers of the types now in common use which will cut off the corn stalks or receive the corn stalks as cut by the pickers and crush, lacerate and macerate them to such an extent as to destroy the corn borer worms or other pests which may infest the corn stalks; to provide means to macerate corn stalks and make them usable as bedding for farm animals, as well as to put them in a form in which much of the stalks can be eaten by livestock; to clear the field of standing corn stalks so as to facilitate plowing thereof; to crush and macerate the corn stalks so they can be plowed under as fertilizer; and to put the macerated corn stalks in convenient form for baling or storing or for use in papermaking or other purposes.

I attain these objects by the means illustrated in the accompanying drawings, in which—

Figure 1:
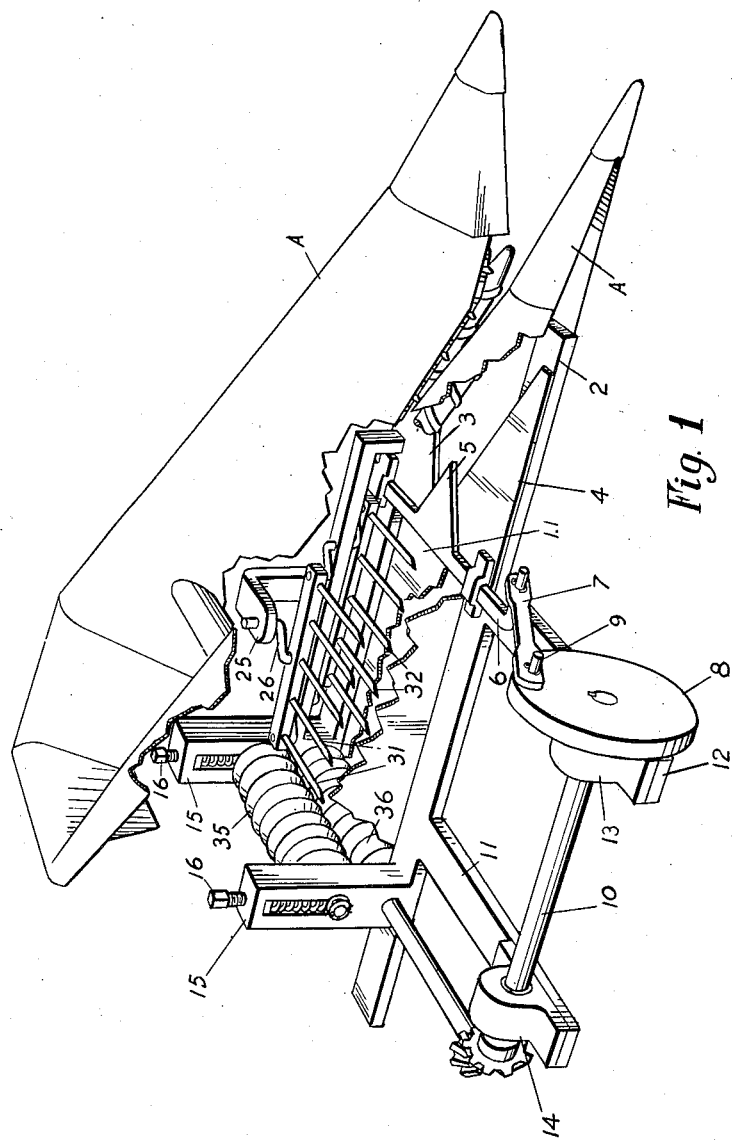
Figure 1 is a perspective view of a fractional part of a cornpicker with my apparatus united thereto, but omitting the gears for driving the rolls.
Figure 2:
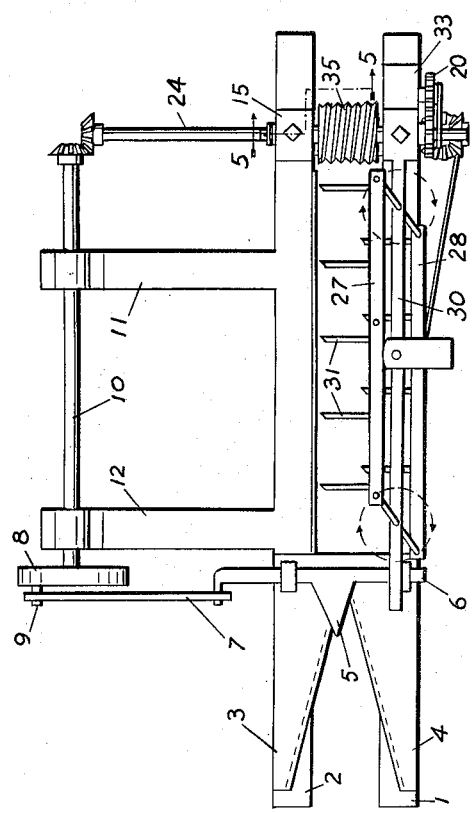
Figure 2 is a plan view.
Figure 3:
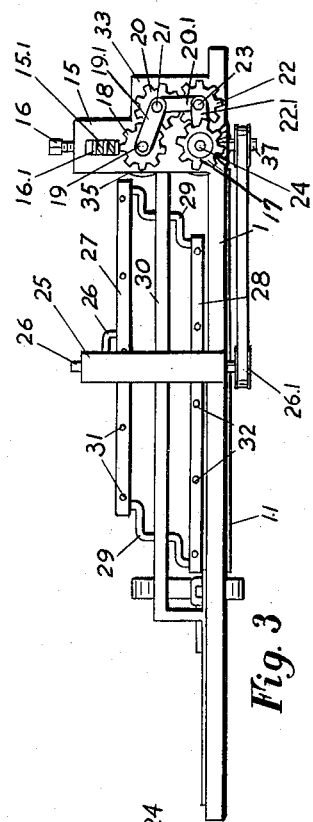
Figure 3 is a side elevation.

All of the views except Figure 1 omit the picker, A as that is a well known machine in common use and I make no claim to any particular type of picker.

Similar numerals refer to similar parts throughout the several views.

My apparatus includes side frames 1 and 2 with a bottom plate 1.1 mounted thereon. At the front end of the bottom plate, blades 3 and 4 are mounted upon the frame and have their inner edges sharpened to assist in cutting off the corn stalks near the ground. A triangular movable blade 5 with sharpened edges is mounted upon the bar 6 at the rear of the blades 3 and 4 and reciprocates with the bar 6 as that bar is driven transversely by the link 7, crank pin 9 and the drive wheel 8.

The wheel 8 is mounted upon a rotatable shaft 10 journaled in the frame members 11 and 12. The shaft 10 may be driven by suitable power connection with the driving mechanism of the picker or its prime mover.

Pickers now in use are commonly provided with a crossbar which bends the corn stalks forwardly as the picker moves ahead. As the corn stalks are cut off by the blades 3, 4 and 5, the butts of the stalks mount the bottom plate 1.1 and are carried rearwardly, butt first.

To insure regular rearward movement of the stalks, I mount a fixed longitudinal bar 30 upon the frame 1. A support 25 is also united to the frame, and carries journaled therein a crank shaft 26. The crank of the crank shaft 26 is journaled in a feed bar 27 which has a plurality of prongs or tines 31 mounted thereon projecting inwardly and the revolving of the crankshaft will cause the bar 27 and the tines 31 mounted thereon to travel in and out and from front to rear in a circular path whereby the stalks will be carried rearwardly along the bed to the rolls.

A similar feed bar 28 with tines 32 is mounted below the bar 30 and is driven by double cranks journaled in the bar 30 with their upper ends journaled in the feed bar 27 and their lower ends journaled in the bar 28 and so arranged that as the crank 26 drives the upper feed bar, the cranks 29—29 will drive the lower feed bar in alternation with the upper one. Thus, as the upper feed bar moves inward and toward the rear, the lower feed bar will be retracted and moved forwardly.

Upon the rear of the frames 1 and 2, I mount columns 15—15 with a shaft 24 journaled therein carrying a roll 36. The columns 15—15 are provided with vertical slots 15.1 in the upper part thereof in which a shaft 19 is rotatably mounted and is arranged to slide vertically.

Upon the shaft 19, a corresponding roll 35 is rigidly mounted. These rolls 35 and 36 have deep threads or grooves formed therein in helical form similar to the threads of a very large screw with deep threads cut therein. These rolls are threaded in opposite directions—that is, one has a lefthand thread and the other a righthand thread—and are so spaced that the outer edge or crest when running idle will reach approximately to the root of the other thread and vice versa.

When the corn stalks are fed to and are passing between the rolls, the shaft of the upper roll can move upwardly in the slots 15.1 as far as necessary to permit the corn stalks to pass between the rolls where the threads of the rolls will cut and mash the stalks to such an extent as to destroy any corn borer worms or other pests which may be located in the stalks. At the same time the stalks are crushed and macerated by the rolls into fragments which form a superior bedding for farm animals and a large part thereof can be eaten by farm animals.

Likewise this crushing process puts the stalks in convenient form to be baled and a form in which they can be readily handled with rakes, pitchforks, etc. It also macerates the stalks to such an extent as to make them readily available for stock for paper making.

In order to drive the rolls 35 and 36 simultaneously, I mount gear wheels 17 and 18 upon their shafts 24 and 19. These gear wheels have spurs which are arranged to mesh with a pair of corresponding gears 20 and 22 mounted upon the shafts 21 and 23 which are journaled in links 19.1, 20.1 and 22.1 carried by the shafts. The shafts 19 and 21 are connected by the link 19.1, the shafts 21 and 23 by the link 20.1 and the shafts 23 and 24 by the link 22.1. As so arranged, the gears form a train by which motion of the gear 17 is transmitted through the gears 22 and 20 to the gear 18 and the rolls, 35 and 36 are driven simultaneously and at uniform speed. The teeth of the gears upon the shaft 19 are cut on lines which will permit tilting of that shaft without undue wear or breakage of the gears.

Helical compression springs 16.1 are mounted in slots 15.1 in the columns 15. The lower ends of the springs 16.1 bear against plates 16.2 resting upon the ball-bearings 38 in which the shaft 19 rotates. In order to give the threads of the rolls 35 and 36 a self-sharpening effect, I mount them so that one side of the threads of the upper roll 35 will contact and press against the opposite side of the threads of the lower roll 36 as at 43.

To maintain this contact with the threads, I mount a helical spring 39 upon the projecting end of the shaft 19. This spring is arranged to bear against washers 40 and 42 and is held under compression by a key or cotterpin 41.

The shaft 24 may be driven by any suitable means operated by the prime mover of the cornpicker. Likewise the drive crank 26 may be driven by the belt 26.1 or other form of power transmission from a belt wheel mounted upon a shaft 37 which is driven by bevel gears from the shaft 24.

While my apparatus is designed to be mounted upon the frame of a corn picker of any of the types in common use, it may be set up as an independent unit with any desired form of prime mover.

As the cornpicker is driven down the rows of standing corn, the picker snaps off the ears and then bends the stalks forward. At the same time the blades 3, 4 and 5 cut the corn stalks off near the ground and they are carried butt first to and through the rolls where they are thoroughly cut, mashed and macerated by the sharp threads of the rolls and the pressure thereof. These rolls not only carry the stalks rearwardly, but the threads are so arranged that they shift the stalks laterally from one side to the other, thus insuring more complete maceration and more complete destruction of the worms hibernating in the stalks.

Figure 5:
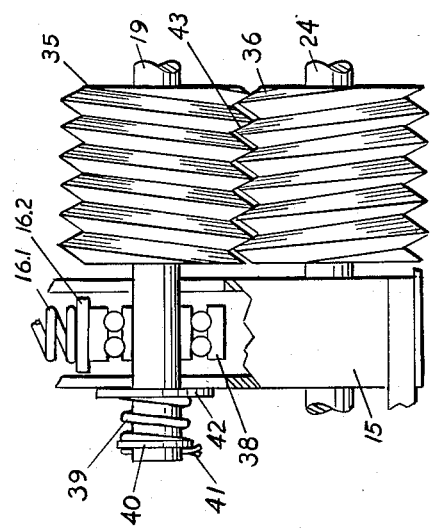
Figure 5 is an enlarged detail of the rolls.
Figure 4:
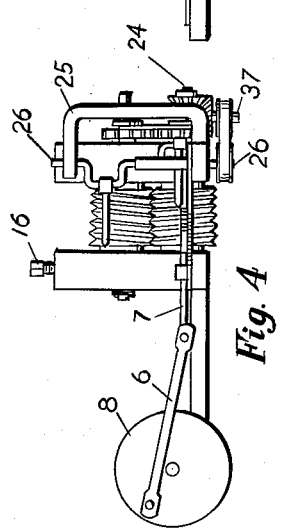
Figure 4 is a front elevation of my apparatus.

The term "threads" is not entirely clear as a designation for the helical slitting, crushing and macerating members formed upon the peripherfies of the rolls as shown in Figure 5, and I use the term "blades" in some of the claims to refer to them. It will be understood that both the terms "threads" and "blades" as so used refer to the triangular projections arranged in helical form upon the rolls carried by the shafts 19 and 24 and that they are triangular in section with the outer edges or crests sharpened sufficiently to readily make longitudinal slits or cuts in the stalks extending through or almost entirely through the stalks. At the same time, the helical form of these threads will cause the stalks to move laterally and make the cuts extend diagonally to that extent; also, the expanding or spreading effect of these threads will cause the sides of the cuts to expand or spread, thereby macerating the stalks to some extent and exerting a crushing action as well as exposing the worms and pupae in the stalks to the destructive effect of the atmosphere and the elements. The spaces between successive threads on the rolls are referred to as "grooves" and it is obvious that as the threads of one roll force the stalks into the grooves of the opposite roll, the stalks will be crushed as well as slit and macerated.

Many changes may be made in the form, proportions and position of the parts without departing from the spirit of my invention and I do not limit my claims to the precise forms shown in the drawings.

I claim:

1. An agricultural implement for processing corn stalks to kill corn worms and pupae therein, including a frame with bed-plate arranged for attachment to a mechanical corn picker, a reciprocating cutting blade mounted at the front of the bed-plate near the ground, a pair of coacting rolls rotatably mounted upon the frame at the rear of the bed-plate having continuous helical cutting and crushing members upon the peripheries thereof whereby the corn stalks passing between the rolls will be simultaneously shredded longitudinally and crushed whereby worms or pupae housed therein may be crushed, cut and destroyed.

2. In a farm implement, for use with a mechanical corn picker, the combination with a frame and bed-plate mounted upon the lower part of the picker, of a crushing, slitting and macerating roll journaled in the frame comprising a cylinder having a continuous cutting and crushing large, sharp-edged blade united to the periphery thereof in helical form, a corresponding and complementary roll journaled in the frame with its blade arranged to bear laterally against the blade of the first roll whereby corn stalks passing between the rolls will be subjected to a simultaneous longitudinal slitting, crushing and shredding action and worms or pupae therein destroyed or exposed to the elements.

3. In a farm implement, for use with a cornpicker, the combination with a frame mounted upon the lower part of the picker, of means to cut the corn stalks off close to the ground, a pair of rolls with coacting radial crushing and slitting blades mounted upon the rear end of the frame, and means to revolve the rolls.

4. An implement for crushing and macerating corn stalks infested by cornborers or other pests, including a frame, means mounted thereon for cutting the corn stalks off close to the ground, a pair of rolls revolvably mounted upon the frame having coacting deep inter-meshing helical grooves and helical sharp-edged threads formed on the peripheries thereof respectively and running in opposite directions, means for revolving the rolls in unison and means for feeding the corn stalks to the rolls.

5. An implement for crushing, slitting and macerating corn stalks, including a frame, means mounted thereon for cutting the cornstalks, a pair of rolls revolvably mounted upon the frame having sharp-edged coacting radial blades and grooves formed in the peripheries thereof, means for revolving the rolls in unison and means for feeding the corn stalks to the rolls whereby the stalks may be both crushed, slitted longitudinally and diagonally and the interior opened and exposed to the elements.

6. An agricultural implement for processing corn stalks, including a frame with bed-plate arranged for attachment to a mechanical corn-picker, a reciprocating cutter blade mounted at the front of the bed-plate, a pair of rolls rotatably mounted upon the frame at the rear of the bed-plate and carrying sharp-edged, deep, intermeshing peripheral threads, and grooves, a pair of alternately reciprocating feed bars mounted on the frame at one side thereof coupled together by double cranks and with inwardly projecting tines or prongs arranged to contact and urge the corn stalks rearwardly butt first when severed, and means to drive the feed bars simultaneously after being severed by the cutter.

7. In an agricultural implement for processing corn stalks, the combination with a frame arranged for attachment to a mechanical corn-picker, of cutting means mounted at the front of the frame to sever the stalks near the ground, a pair of rolls rotatably mounted upon the frame having sharp, deep, intermeshing peripheral threads thereon, feeding means mounted on the frame arranged to contact and feed the corn stalks rearwardly to the rolls butt first when severed, and means to actuate the rolls and feeding means simultaneously.

8. In an agricultural implement for processing corn stalks, the combination with a frame arranged for attachment to a mechanical corn-picker, of cutting means mounted at the front of the frame to sever the stalks near the ground, a pair of rolls rotatably mounted upon the frame having sharp, deep, intermeshing peripheral triangular blades and grooves thereon, feeding means mounted on the frame arranged to contact and feed the corn stalks rearwardly to the rolls butt first when severed, and means to drive one of said rolls directly and the other roll by a gear train from the driven roll.

9. In a combination as described in claim 8, said gear train of rolls being arranged to permit variable spacing of the rolls to accommodate varying thicknesses of the stalks.

10. An implement as described in claim 4, one of said rolls having a shaft journaled in fixed bearings in the frame, and the other roll having its shaft journaled in spring-held bearing blocks slidably mounted in vertical slots in the frame whereby the spacing of said rolls may be varied automatically by the stalks passing between them.

11. An implement as described in claim 4, one of said rolls having a shaft journaled in fixed bearings in the frame, and the other roll having its shaft journaled in bearing blocks slidably mounted in vertical slots in the frame whereby the spacing of said rolls may be varied automatically by the stalks passing between them, and helical compression springs mounted in the slots arranged to exert pressure upon the bearing blocks of the movable roll.

12. An implement as described in claim 4, one of said rolls having a shaft journaled in fixed bearings in the frame, and the other roll having its shaft journaled in bearing blocks slidably mounted in vertical slots in the frame whereby the spacing of said rolls may be varied automatically by the stalks passing between them, helical compression springs mounted in the slots arranged to exert pressure upon the bearing blocks of the movable roll, and adjusting screws mounted in the frame to adjust the compression of the helical springs upon their bearing blocks respectively.

13. An agricultural implement for processing corn stalks, including a frame with bed-plate arranged for attachment to a mechanical corn-picker, a reciprocating blade mounted at the front of the bed-plate, a pair of rolls rotatably mounted upon the frame at the rear of the bed-plate and carrying sharp-edged, deep, intermeshing peripheral triangular threads and grooves, one of said rolls having a shaft journaled in horizontal position in fixed bearing in the frame and the shaft of the other roll being journaled in movable bearings slidingly mounted in vertical slots formed in the frame, helical compression springs mounted in the slots arranged to exert pressure upon the bearing blocks of the movable roll, adjusting screws mounted in the frame to adjust the compression of the helical springs upon their bearing blocks respectively, means to drive the fixed roll directly and a train of gears to drive the movable roll from and simultaneously with the fixed roll but in the opposite direction.

14. An implement as described in claim 3, and means to hold one side of the threads of one roll in close contact with the opposite side of the threads of the other roll.

15. The combination as described in claim 8, and a compression spring mounted upon the shaft of the idler roll arranged to urge one side of the threads of the idler roll into close contact with the opposite side of the opposed threads of the driven roll.

16. The combination as described in claim 8, and means to hold one side of the threads of one roll in contact with the opposite side of the opposed threads of the other roll.

17. An implement as described in claim 4, one of said rolls having a shaft journaled in fixed bearings in the frame, and the other roll having its shaft journaled in bearing blocks slidably mounted in vertical slots in the frame whereby the spacing of said rolls may be varied automatically by the stalks passing between them, the roll upon the slidable shaft being arranged with one side of its threads in contact with the opposite side of the threads of the fixed roll and projecting into the opposed groove of the fixed roll whereby the stalks may be both crushed, slitted longitudinally and diagonally and the interior opened and exposed to the elements.

18. An implement as described in claim 4, one of said rolls having a shaft journaled in fixed bearings in the frame, and the other roll having its shaft journaled in bearing blocks slidably mounted in vertical slots in the frame whereby the spacing of said rolls may be varied automatically by the stalks passing between them, the roll upon the slidable shaft being arranged with one side of its threads extending into the opposite groove and in contact with the adjacent side of the threads of the fixed roll, and spring actuated means to urge the said sides of the threads toward each other.

JOSEPH T. DVORAK.

REFERENCES CITED

The following references are of record in the file of this patent:

UNITED STATES PATENTS

| Number | Name | Date |
|---|---|---|
| 588,752 | Moeller | Aug. 24, 1897 |
| 1,940,851 | Everett et al. | Dec. 26, 1933 |
| 2,293,757 | Jochumsen | Aug. 25, 1942 |
| 2,345,715 | Reed | Apr. 4, 1944 |
| 2,347,664 | Chilton | May 2, 1944 |
| 2,349,328 | Aasland | May 23, 1944 |
| 2,385,193 | Burgin | Sept. 18, 1945 |